United States Patent [19]

Fichter

[11] Patent Number: 4,607,926
[45] Date of Patent: Aug. 26, 1986

[54] APPARATUS FOR PROCESSING AND/OR PROJECTING TRANSPARENCY FILM ASSEMBLAGES

[75] Inventor: Peter K. Fichter, Canton, Mass.

[73] Assignee: Polaroid Corporation, Cambridge, Mass.

[21] Appl. No.: 718,642

[22] Filed: Apr. 1, 1985

[51] Int. Cl.⁴ .............................................. G03B 17/52
[52] U.S. Cl. ........................................ 354/78; 354/86; 354/304
[58] Field of Search ........................ 354/77, 78, 83, 84, 354/85, 86, 304

[56] References Cited

U.S. PATENT DOCUMENTS

| | | | |
|---|---|---|---|
| 3,225,670 | 12/1965 | Friedman et al. | 354/86 |
| 3,350,990 | 11/1967 | Finelli et al. | 354/86 |
| 3,369,470 | 2/1968 | Downey | 354/86 |
| 3,541,937 | 11/1970 | Nerwin | 354/86 |
| 3,541,938 | 11/1970 | Harvey | 354/85 |
| 3,636,844 | 1/1972 | Kamp | 354/86 |
| 4,114,166 | 9/1978 | Driscoll et al. | 354/76 |
| 4,132,471 | 1/1979 | Svatek et al. | 354/86 |
| 4,256,527 | 3/1981 | Green | 156/443 |
| 4,508,437 | 4/1985 | Johnson | 354/86 |

Primary Examiner—A. A. Mathews
Attorney, Agent, or Firm—Alfred E. Corrigan

[57] ABSTRACT

Apparatus for processing a transparency film assemblage subsequent to the photographic exposure of its instant type film frame. The apparatus includes a pair of rollers for spreading a layer of processing liquid between the film frame and a strip sheet, a stripping roller for grasping a free end of the strip sheet and removing it from covering relation with a visible image in the film frame, and structure for folding an apertured section of a film mount into face-to-face relation with another apertured section of the mount such that the film frame is sandwiched therebetween with its image area in alignment with the aperture in each section.

10 Claims, 11 Drawing Figures

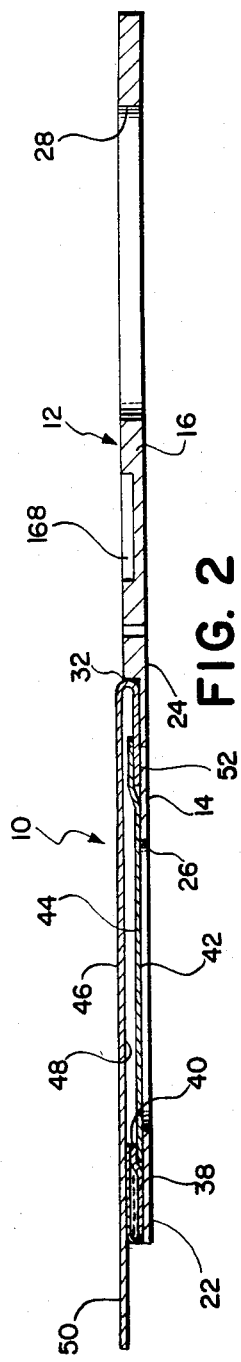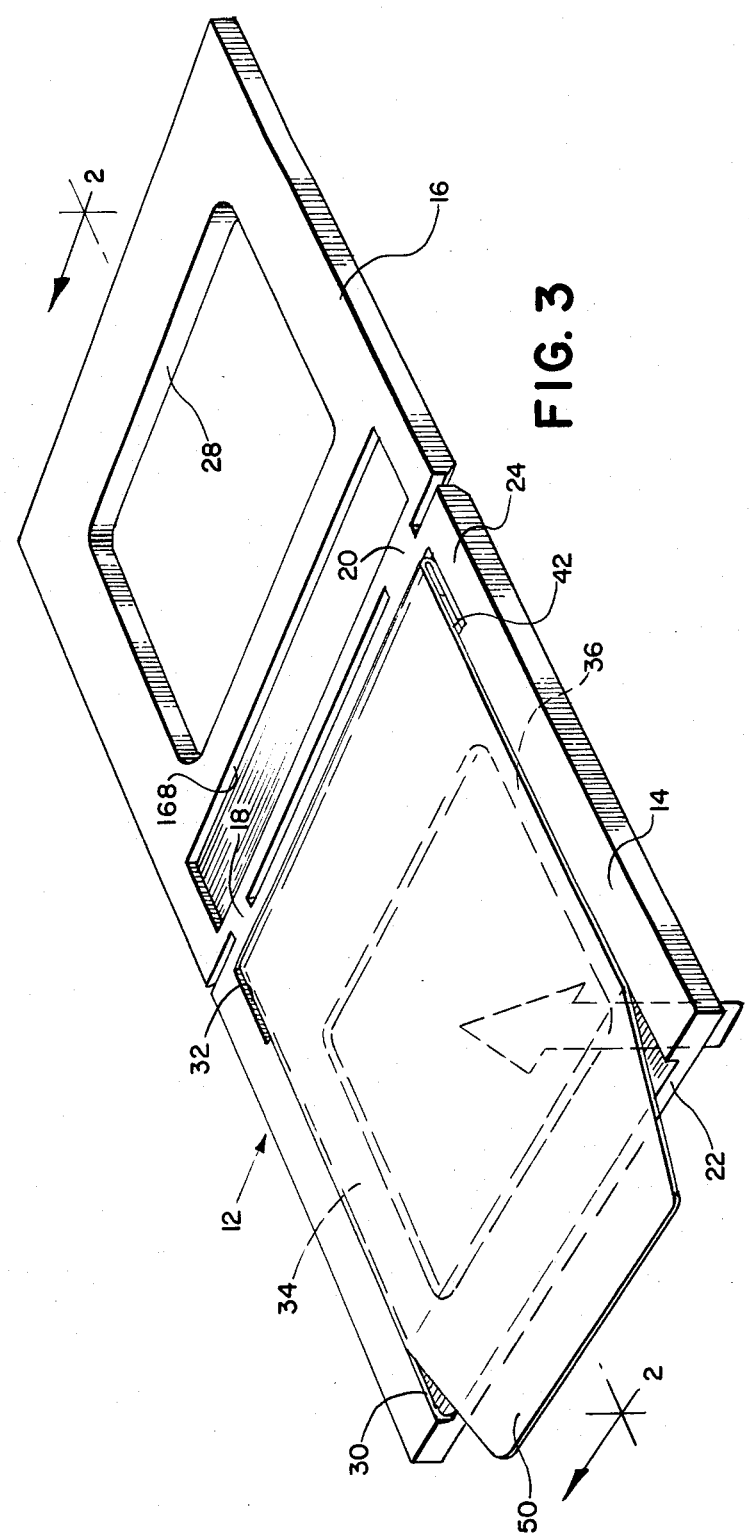

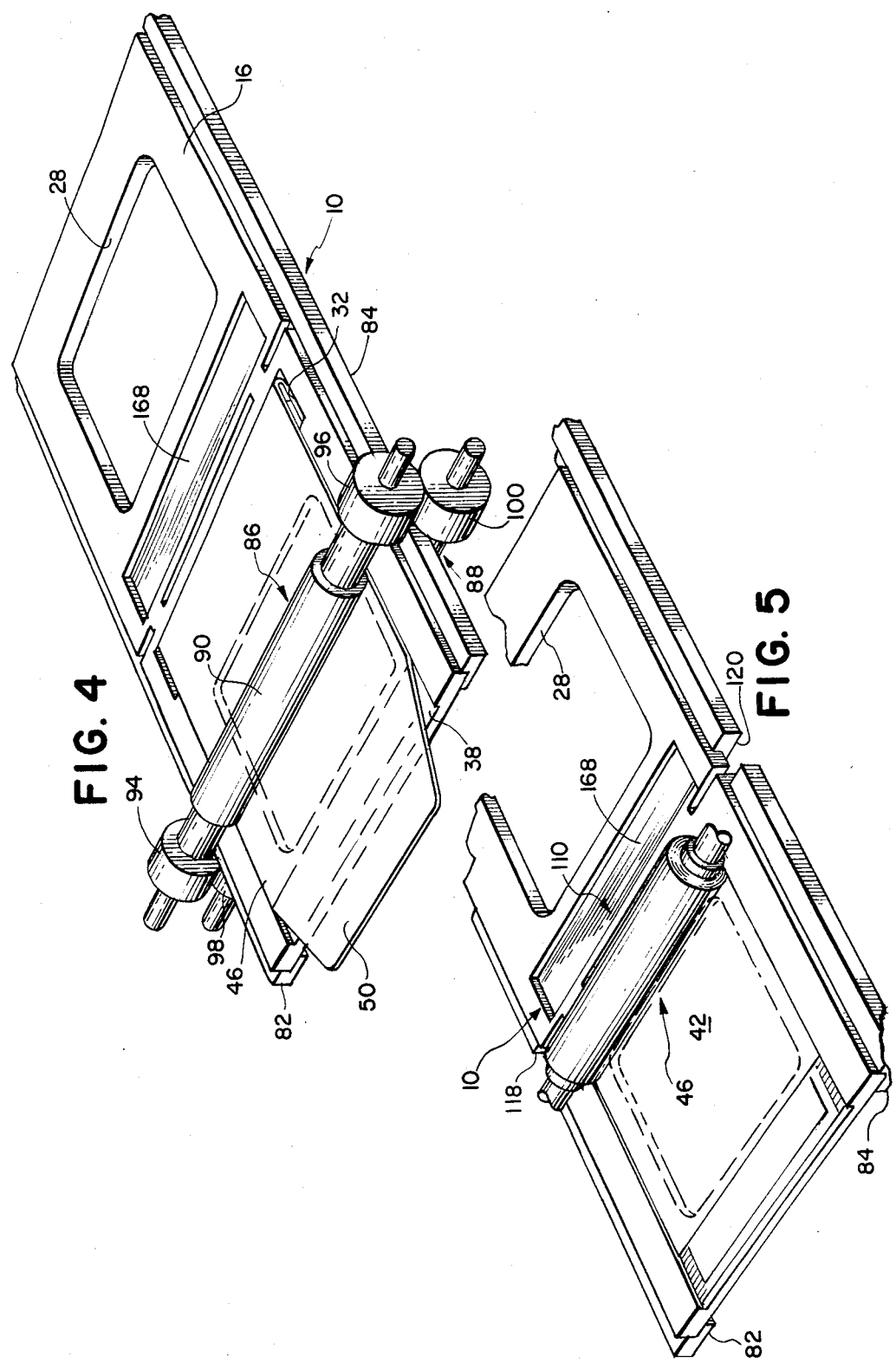

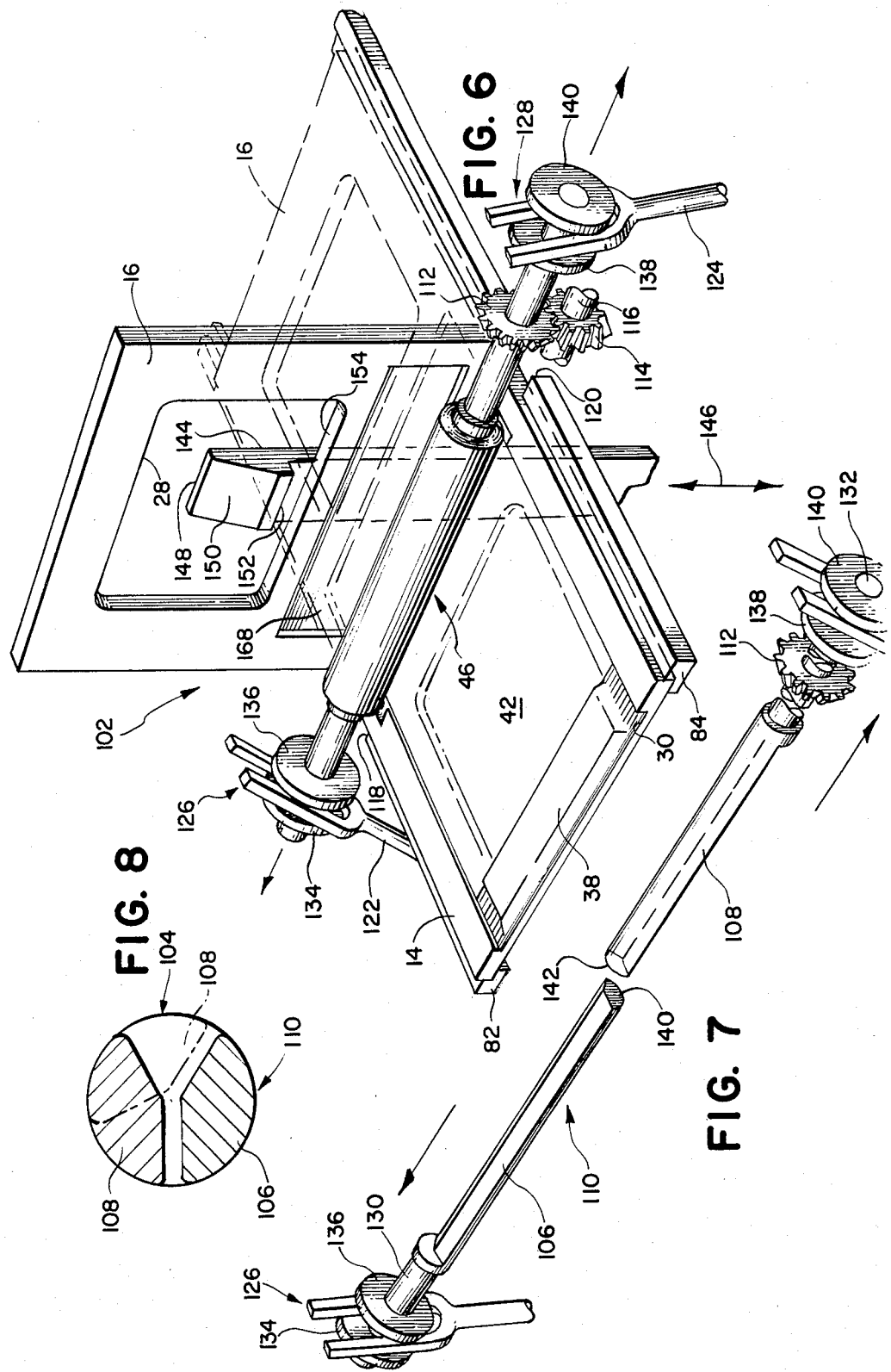

APPARATUS FOR PROCESSING AND/OR PROJECTING TRANSPARENCY FILM ASSEMBLAGES

CROSS REFERENCE TO RELATED APPLICATION

This application is related to my copending application Ser. No. 718,641 entitled "Transparency Film Assemblage", filed on instant date herewith.

BACKGROUND OF THE INVENTION

1. Field of the Invention

The invention relates to apparatus for processing transparency film assemblages of the instant or self-developing type.

2. Description of the Prior Art

Apparatus for processing transparency film assemblages of the type which includes instant or self-developing type film generally fall into two main categories. In the first category, a transparency film assemblage is manually pulled between a pair of pressure generating members which rupture a container of processing liquid and spread its contents between elements of the assemblage to intiate fhe formation of a visible image in a film frame. Later, the transparency film assemblage is manually manipulated by the operator to remove certain elements of the assemblage, e.g., spent pod, emulsion layer strip sheet, leader, etc., before it can be placed in an apparatus for viewing of the photographed scene. Examples of apparatus in the first category may be found in U.S. Pat. Nos. 3,369,470 and 3,225,670.

In the second category, a transparency film assemblage is exposed and processed as described above except for the removal of the assemblage's pod, trap, or emulsion layer. For example, in U.S. Pat. No. 4,114,166, the transparency film assemblage may be immediately moved into a viewer station of a camera after its processing while in the apparatus disclosed in U.S. Pat. No. 4,132,471, the processed assemblage generally retains its original make up except for the removal of an opaque backing sheet.

The apparatus which fall into the first category suffer from their inability to provide a garbage free, fully mounted, film transparency which may be immediately placed in a projector or viewer. The apparatus which fall into the second category suffer from their inability to strip the emulsion or photosensitive layer from the film frame during processing of the assemblage thus presenting to the operator a film tansparency whose visual acuity, brightness and stability are adversely affected because of the retention of the emulsion layer and residual processing liquid.

An object of the invention is to provide an apparatus for processing a transparency film assemblage in a manner which produces a garbage free unit whose emulsion layer has been substantially removed during such processing.

Another object of the invention is to provide an apparatus of the type described above with means for removing a strip sheet having an emulsion layer of a film frame attached thereto from an area of the film frame which is to be subsequently projected.

Another object of the invention is to provide an apparatus of the type described with means for grasping a strip sheet of a transparency film assemblage and removing it from superposition with an area of a film frame which is to be subsequently viewed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For fuller understanding of the nature and objects of the invention, reference should be had to the following detailed description taken in connection with the accompanying drawings wherein:

FIG. 2 is a cross-sectional view of the transparency film assemblage taken along the line 2—2 in FIG. 3;

FIG. 3 is a perspective view of the transparency film assemblage;

FIG. 4 is a perspective view of the transparency film assemblage as it moves between a pair of processing rollers mounted in the instant invention;

FIG. 5 is a perspective view of the transparency film assemblage as one of its elements is being stripped from a film frame;

FIG. 6 is a perspective view of the transparency film assemblage during another step in its processing;

FIG. 7 is a partially exploded perspective view of a roller of the apparatus used in the stripping step shown in FIGS. 5 and 6;

FIG. 8 is a cross-sectional view of the roller shown in FIGS. 5-7.

DETAILED DESCRIPTION OF THE INVENTION

Figure 1:
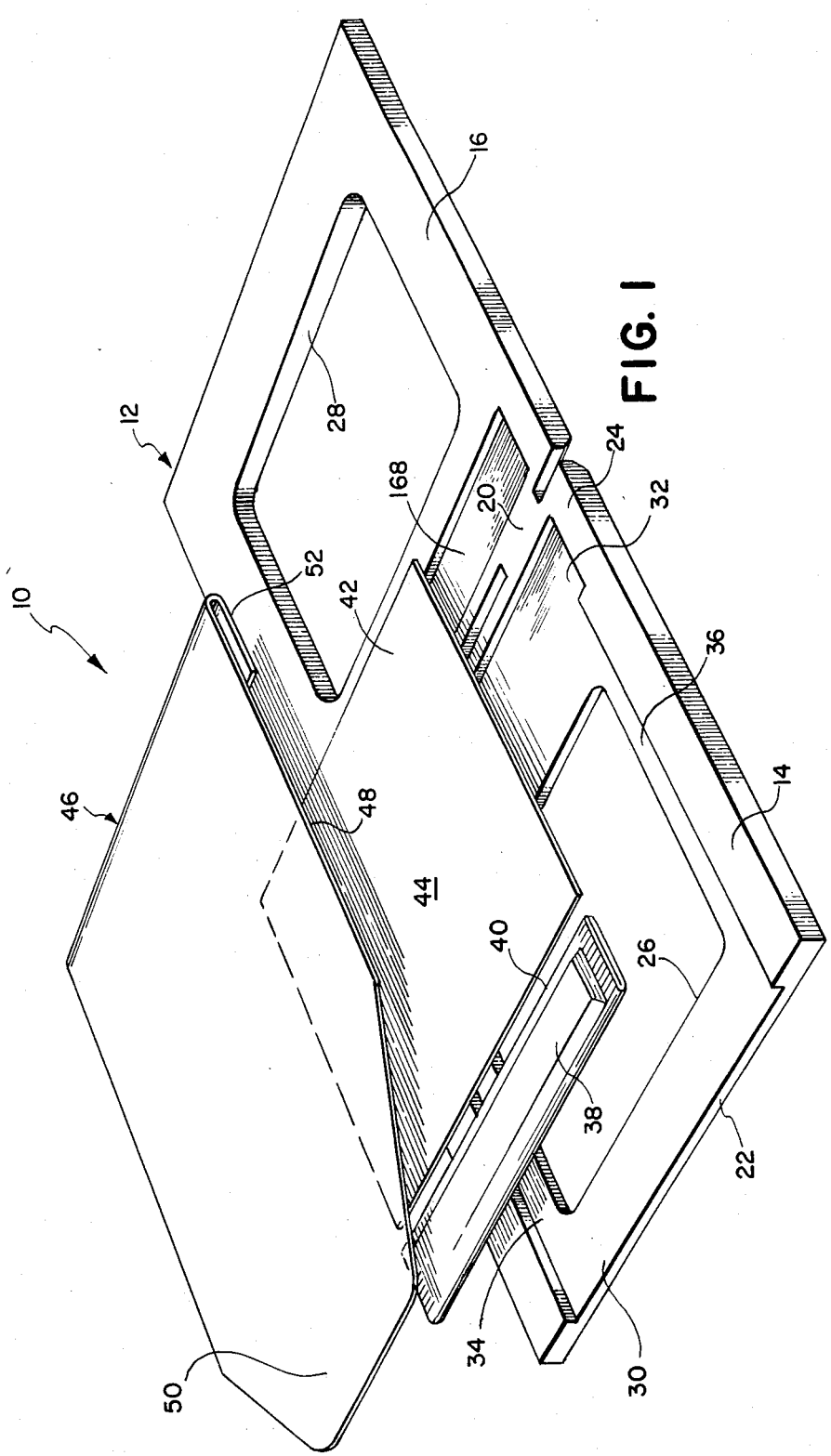
FIG. 1 is an exploded perspective view of a transparency film assemblage which is adapted for use in the apparatus of the instant invention.

Reference is now made to the drawings, and in particular to FIGS. 1-3, wherein is shown a transparency film assemblage 10. The assemblage 10 includes a mount 12 formed from any suitable material, e.g., plastic. The mount 12 includes first and second sections 14 and 16 having means in the form of integral hinges 18 and 20 connecting the two sections 14 and 16 to each other for movement of the second section 16 from the position shown in FIGS. 1-3 to the position shown in FIG. 9. The first section 14 includes first and seconds ends 22 and 24 which are separated by a first aperture 26 while the second section 16 has a second aperture 28 therein which is generally of the same dimensions as the first aperture 26. The first end 22 of the first section 14 is provided with a laterally extending recess 30 and the second end 24 of the first section 14 is provided with a second, slightly longer, recess 32 as measured in a lateral direction. The first and second recesses 30 and 32 are interconnected by a pair of longitudinally extending recesses 34 and 36. Mounted within the first recess 30 is a conventional pod or rupturable container 38 of processing liquid having a discharge end 40 facing in the direction of the first aperture 26.

The transparency film assemblage 10 also includes an unexposed film frame 42 of the self-developing or instant type, which film is well known and may be of the type shown and described in U.S. Pat. No. 4,375,324. The film frame 42 has portions of its peripheral edges secured to horizontal surfaces of the recesses 30, 32, 34 and 36 such that an emulsion layer 44 thereof is located immediately below the discharge end 40 of the pod or container 38.

Also an element of the transparency film assemblage 10 is a sheet of material 46 having a coating of gelatin on a major surface 48 thereof. The sheet of material 46 is adapted to be located in superposed relation to the film frame 42 with its gelatin coated surface 48 in face-to-face relation with the emulsion layer 44 of the film frame 42. The sheet 46 has a width substantially equal to the width of the film frame 42 and a length which is longer than the corresponding dimension of the film frame 42. This longer length provides for a tapered leading end 50, which extends forwardly of the first end 22 of the first section 14, and a trailing end 52 which is folded under itself and the right hand end of the film frame, as viewed in FIG. 2. The trailing end 52 is suitably secured to the underside of the end of the film frame 42 to thereby define a trap 54 for containing any excess processing liquid that may remain after the spreading of the liquid between the film frame 42 and the sheet 46, as will be more fully described later.

A plurality of the film assemblages 10 are adapted to be stacked within a film cassette 56 with the first and second sections 14 and 16 of each film frame 12 located in side-by-side relation thus providing for a relatively slender film cassette 56. As mentioned above, the photographic exposure of each assemblage 10 may take place while the assemblage is located in the film cassette 56, in which case the sheet material 46 is opaque or an opaque insert is located between adjacent assemblages 10 in the stack, thus preventing the exposure of more than one assemblage 10 at a time. Alternatively, the assemblages 10 may be moved, sequentially, to the outside of the film cassette 56 for their photographic exposure, as shown in FIG. 10.

Figure 10:
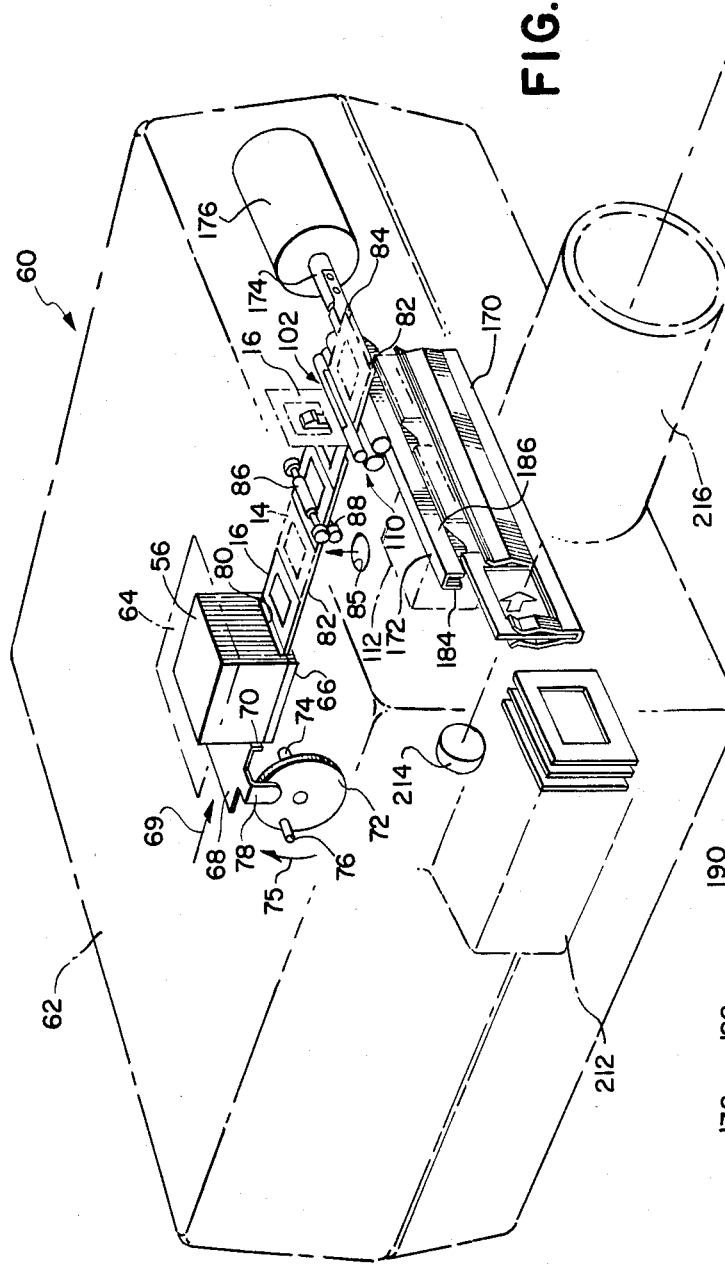
FIG. 10 is a perspective view, partly in phantom lines, showing a preferred embodiment of an apparatus for processing the transparency film assemblages.

The film cassette 56 is adapted to be placed in an apparatus 60, as shown in FIG. 10. The apparatus 60 includes a housing 62, shown in phantom lines, having a loading door 64 through which the film cassette 56 may be inserted and positioned on a support plate 66. Located to the left of the support plate 66 (as viewed in FIG. 10) is a transparency film assemblage advancing means 68 having a vertical flange 70 of a width and depth substantially equal to that of the trailing end of the second section 16 of a film mount 12 which it is adapted to engage during movement of the assemblage 10. The advancing means 68 is adapted to be moved in the direction of the arrow 69 by a mechanism including a disc 72 mounted on a driven shaft 74. A pin 76 extends outwardly from a face of the disc 72 and is adapted to be rotated in the direction of the arrow 75 into engagement with a downwardly extending portion 78 of the advancing means 68 to initially drive the advancing means 68 through a distance just sufficient to enable the flange 70 to enter the cassette 56 and advance a transparency film assemblage 10 from the film cassette 56 via an exit slot 80 to an exposure position whereat its longitudinally extending sides are supported by a pair of longitudinally extending L-shaped rails 82 and 84. After the film frame 42 of the assemblage 10 has been exposed to image bearing rays which enter the apparatus 60 via an aperture in its bottom wall, the drive to the shaft 74 is again energized. Note, at this time the pin 72 is still in engagement with the portion 78. This second energization of the shaft 74 continues the movement of the advancing means 68 in the direction of the arrow 69 until the first end of the first section 14 of the assemblage 10 enters the bite of a pair of pregapped rollers 86 and 88. The roller 86 includes a central section 90 of a given diameter and having a length slightly less than the width of the recess 30 whereas the roller 88 includes a similar central section having a length less than the distance between the rails 82 and 84. The roller 86 further includes end sections 94 and 96 which are adapted to engage similar end sections 98 and 100 on the roller 88 to establish a minimum gap between the rollers 86 and 88 and the thickness of the layer of processing liquid to be spread between the film frame 42 and the sheet material 46. The diameters of the end sections 94, 96, 98 and 100 are slightly greater than that of the central section of each roller. The roller 86 is resiliently mounted for movement in a vertical direction toward and away from the roller 88 (which is fixed against such movement) by any suitable means (not shown). The central section of each roller is separated from its respective end sections by intermediate sections having a diameter less than that of the central section. These intermediate sections provide for clearance of the longitudinal sides of the assemblages and the rails 82 and 84. The rollers 86 and 88 are adapted to be driven in the direction of the arrows so as to advance the assemblage 10 toward a stripping station 102 while simultaneously rupturing the container 38 and spreading its contents between the emulsion side 44 of the film frame 42 and the gelatin coated surface 48 of the sheet material 46, with any excess processing liquid being collected in the second recess 32.

As the film assemblage 10 approaches the stripping station 102, the tapered end 50 of the sheet material 46 enters a converging gap 104 defined by first and second portions 106 and 108, respectively, of a stripping roller 110. One end of the second portion 108 is provided with a bevel gear 112 which is adapted to be moved into and out of driven engagement with a second bevel gear 114 which is fixedly mounted on a drive shaft 116. After 1) the end 50 of the sheet material 46 has entered the gap 104 of the stripping roller 110, 2) the assemblage 10 has moved out of engagement with the rollers 86 and 88, and 3) the formation of a visible image in the film frame 42 has been initiated, a drive to the shaft is energized so as to rotate the second portion 108 from the solid line position, as shown in FIG. 8, to the broken line position thereby substantially narrowing the gap 104 while also functioning to pinch the end 50 of the sheet material 46 between facing surfaces of the first and second portions 106 and 108. Further rotation of the second portion 108 in a clockwise direction is effective to drive the first portion 106 in the same direction thereby causing the sheet material 46 to be wound upon the stripping roller 110 as it is being stripped from the film frame 42. During this period of winding the sheet material 46 upon the stripping roller 110, the assemblage 10 is being advanced to the left, as viewed in FIG. 6, until the integral hinges 18 and 20 thereof are located above a separation 118 and 120 in the L-shaped rails 82 and 84, respectively. As the sheet material 46 is being stripped from the film frame 42 it also removes the film frame's photosensitive layer 44 thus increasing visual acuity and brightness of the resultant positive transparency while also enhancing its stability by virtue of the removal of residual processing liquid in the photosensitive or emulsion layer 44. An example of such a film may be found in U.S. Pat. No. 3,682,637, granted to E. H. Land on Aug. 8, 1972. Rotation of the stripping roller 110 in the clockwise direction is stopped when it is located immediately above the second recess 32, as best shown in FIGS. 5 and 6, and the second portion 108 is in the broken line position shown in FIG. 8. The drive to the shaft 116 is then momentarily reversed to thereby move the second portion 108 into its solid line position in FIG. 8 thus releasing the roller's grip on the tapered end 50 of the sheet material 46. The first and second portions 106 and 108 of the stripping roller 110 are removed from the core of the roll of stripped sheet material 46 and the film's emulsion layer 44 by rotating a pair of Y-shaped members 122 and 124 about horizontal axes (not shown) in a direction away from each other. Each of the Y-shaped members 122 and 124 includes a pair of legs 126 and 128 which straddle end shafts 130 and 132 of the stripping roller 110 and are trapped between annular flanges 134 and 136 on the end shaft 130 and similar flanges 138 and 140 on the end shaft 132. Such movement of the Y-shaped members 122 and 124 is sufficient to remove the ends 140 and 142 of the first and second portions 106 and 108, respectively, of the stripping roller 110 from the ends of the roll of sheet material 46, thus leaving the latter sitting in the second recess 32 of the first section 14 of the film mount 12. Suitable means (not shown) are provided for supporting the first and second portions 106 and 108 in a horizontal plane during their movement toward and away from each other.

Figure 9:
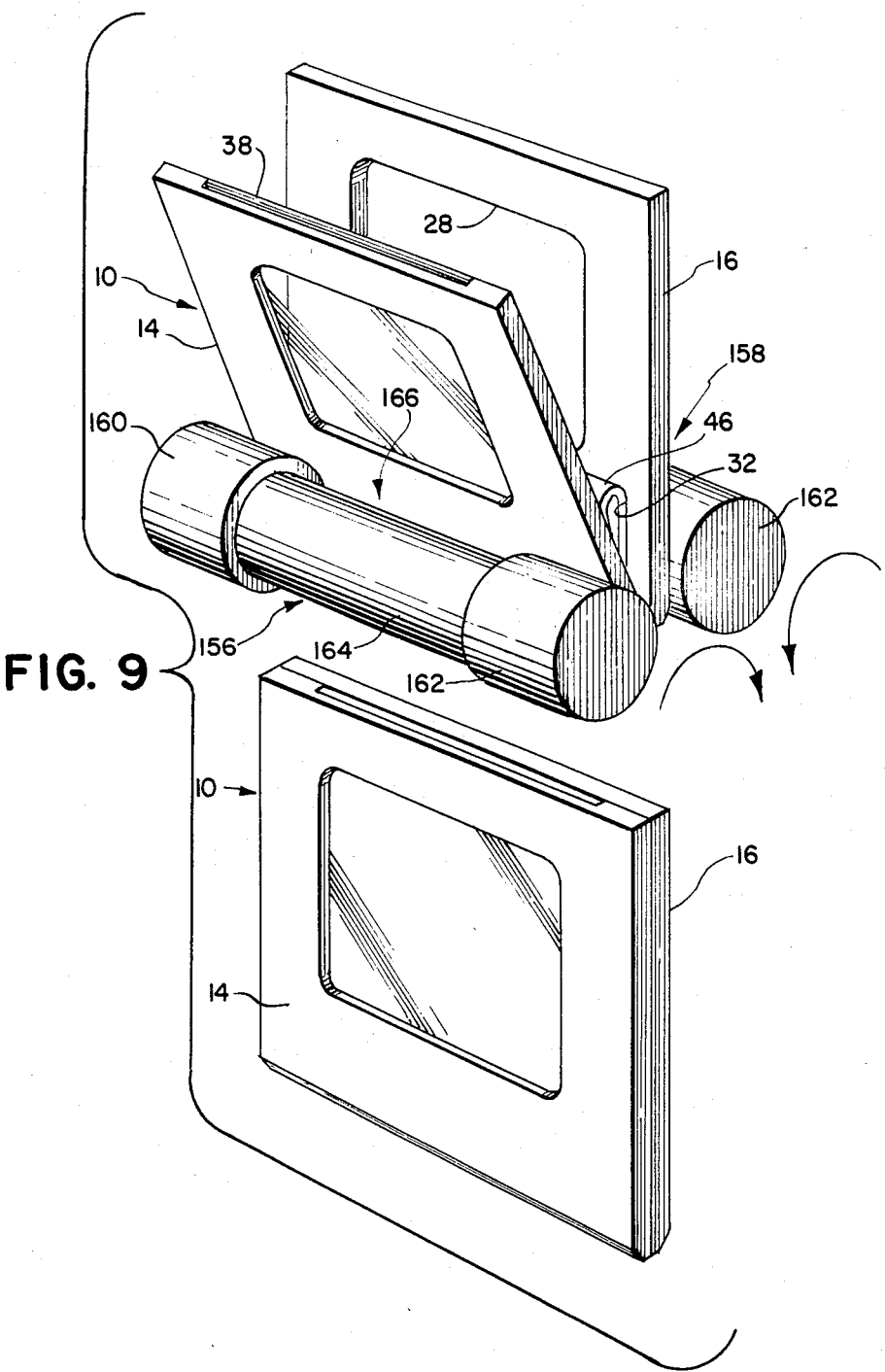
FIG. 9 is a perspective view of the transparency film assemblage during and after its passage between a pair of laminating rollers of the apparatus.

After the ends 140 and 142 of the first and second portions 106 and 108 of the stripping roller 110 have been removed from the roll of sheet material 46, the motor (not shown) of the apparatus 60 is energized to drive an elongate member 144 in a reciprocating manner, as indicated by the arrow 146. As the elongate member 144 moves upwardly, its end 148 engages an under surface of the second section 16 of the film mount 12 at a point intermediate its connection to the first section 14 and the aperture 28, thus pivoting the second section 16 from the broken line to the solid line position shown in FIG. 6. During the latter portion of such upward movement, an inclined surface 150 on the member 144 cams the second section into the vertical position wherein an undercut portion 152 is located above and in alignment with an edge 154 of the second aperture 28. At this time the elongate member's direction of movement is reversed thereby causing the undercut portion 152 to engage the edge 154 and pull the film mount 12 downwardly towards and into the bite of a pair of identical rollers 156 and 158 (FIG. 9). Each of the rollers 156 and 158 is provided with end portions 160 and 162 of a greater diameter than their intermediate portion 164 so as to define a gap 166 through which the elongate member 144 may be reciprocated without touching the rollers 156 and 158. As the second section 16 of the film mount 12 is being pulled downwardly, the first section 14 automatically pivots or folds itself toward the second section 16 as the two sections 14 and 16 pass between the separations 118 and 120 in the rails 82 and 84, respectively. During such folding, the roll of sheet material 46 is gradually encompassed and compressed within a chamber defined by the aforementioned second recess 32 in the first section 14 and a correspondingly configured recess 168 located in the second section 16. Also, the expended container 38 is sandwiched between the two sections as they pass between the rollers 156 and 158. Suitable means (not shown) such as adhesive coated mating surfaces or interlocking snap members may be provided for maintaining the two sections 14 and 16 in face-to-face relation with their respective apertures 26 and 28 located in alignment with each other and with the area of the film frame which is adapted to be viewed. One or both of the rollers 156 and 158 may be power driven or the assemblage 10 may be completely pulled between the rollers 156 and 158 by the elongate member 144.

As the now fully processed film assemblage 10 moves away from the folding means, i.e., the elongate member 144 and the rollers 156 and 158, it is deflected forwardly into a generally horizontally extending track 170 wherein its trailing or upper end is located below a longitudinally extending U-shaped rail 172. One end of the rail 172 is connected to an armature 174 of a solenoid 176 for reciprocating movement in a horizontal direction. A plurality of members 178, 180, and 182 are pivotally connected between opposite walls 184 and 186 of the rail 172 by pivot pins 188, 190, and 192. The members 178, 180 and 182 are normally resiliently biased into the position shown in FIG. 11 by springs 194, and 198 and stopped therein by any suitable means (not shown). Also, each of the members 178, 180 and 182 includes a generally vertical edge 200, 202 and 204, respectively, for engaging and moving an assemblage 10 to the left, as viewed in FIG. 11, and an inclined surface 206, 208 and 210, respectively, which is adapted to be engaged by an assemblage 10 during movement of the rail 172 to the right for camming the members 178, 180 and 182 upwardly to an inoperative position wherein they may pass over the assemblages 10.

Figure 11:
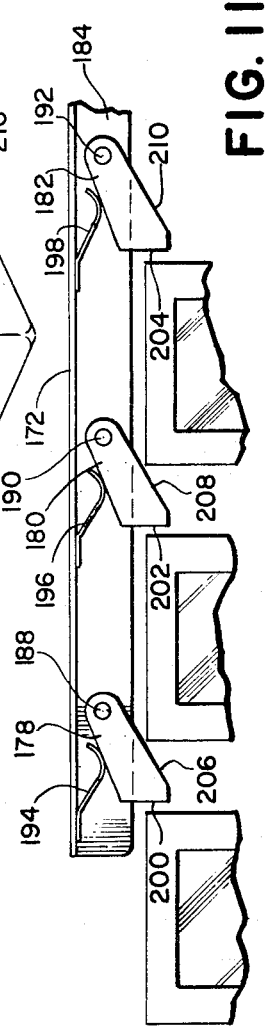
FIG. 11 is an enlarged view of a portion of the apparatus shown in FIG. 10.

In the situation depicted in FIGS. 10 and 11, three fully processed transparency film assemblages 10 are located in the track 170 with the one on the right located below the stripping station 102, the intermediate assemblage 10 located in a position wherein it may be moved rearwardly into an accumulation chamber 212 (shown in phantom lines for reasons of clarity) or further to the left into a projection station wherein a lamp 214 may project the image in the assemblage 10 through a lens tube 216 on a viewing screen, and the left asemblage 10 which is located at the projection station. When the solenoid 176 is energized it drives the U-shaped rail 172 to the left thereby causing the member 178 to move the left assemblage 10 from the projection station into a storage chamber 218 wherein it urges a stack of assemblages 10 rearwardly as it occupies an endmost position in the stack. Simultaneously therewith, the intermediate assemblage 10 is moved into the projection station and the right hand film assemblage 10 is moved into the position previously occupied by the intermediate film assemblage 10. Upon deenergizing the solenoid 176 the U-shaped rail 172 moves to the right thereby causing the members 178 and 180 to be cammed upwardly so that they may pass over and drop in behind the assemblages 10 located in the projection station and in front of the accumulation chamber 212, respectively, thus leaving the right hand end of the track 170 empty in preparation to receive another fully processed transparency film assemblage 10 from the rollers 156 and 158.

Since certain changes may be made in the above described invention without departing from the scope thereof, it is intended that all matter contained in the above description or shown in the accompanying drawings shall be interpreted as illustrative and not in a limiting sense.

What is claimed is:

1. Apparatus for processing a transparency film assemblage of the type comprising a film mount having first and second apertured sections through which light may be transmitted so as to project an image, an unexposed transparency film frame secured to the first section, a rupturable container of processing liquid, and a strip sheet located in superposed relation to the film frame so as to assist in the spreading of the processing liquid between the strip sheet and a major surface of the film frame and in the removal of the film frame's emulsion layer, said apparatus comprising:

means for supporting a transparency film assemblage in position for the photographic exposure of a film frame carried by the first apertured section of a film mount;

means for advancing the transparency film assemblage, subsequent to its exposure, from said supporting means to a rupturing means;

means for rupturing a container of processing liquid and spreading the processing liquid between the film frame and a strip sheet, subsequent to the exposure of the film frame, to initiate the formation of a visible image therein while simultaneously advancing the transparency film assemblage toward a stripping means;

means for stripping the strip sheet and the film frames' emulsion layer from the area of the film frame to be projected, subsequent to the formation of a visible image within the film frame; and means for folding a second apertured section of the film mount into superposed relation with the first apertured section and securing it thereto such that the film frame is sandwiched therebetween with its image in alignment with the aperture in each section of the film mount.

2. Apparatus as defined in claim 1 wherein said stripping means includes a roller having first and second portions which define a gap for receiving an end of the strip sheet as the transparency film assemblage is being advanced by said rupturing means.

3. Apparatus as defined in claim 2 further including means for rotating said second portion in a direction so as to narrow said gap while simultaneously grasping the end of the strip sheet.

4. Apparatus as defined in claim 3 wherein continued rotation of said second portion in said direction is effective to drive said first portion in the same direction thereby winding the strip sheet on said roller.

5. Apparatus as defined in claim 4 further including means for moving said first and second portions of said roller in opposite directions, generally parallel with the axis of rotation of said roller, subsequent to the strip sheet being uncovered from the image area of the transparency film frame to be projected, thus leaving the rolled up strip sheet on the first apertured section of the film mount.

6. Apparatus as defined in claim 1 wherein said folding means includes a reciprocally mounted member for engaging and moving the second apertured section of the film mount from a first position, wherein it defines an angle with the first apertured section, to a second position, wherein it defines a smaller angle with the first apertured section.

7. Apparatus as defined in claim 6 wherein said folding means further includes a pair of rollers, and said reciprocally mounted member includes means for moving the transparency film assemblage to a position between said pair of rollers after the second apertured section of the film mount has been moved into said second position, said pair of rollers being adapted to firmly press the first and second apertured sections into contact with each other.

8. Apparatus as defined in claim 7 wherein said pair of rollers are configured to allow the passage therethrough of a portion of said reciprocally mounted member.

9. Apparatus as defined in claim 1 further including means defining a station at which the visible image in the film frame may be projected onto a viewing screen and means for moving a transparency film assemblage into and out of said station.

10. Apparatus as defined in claim 9 further including a storage chamber for receiving the transparency film frame as it is advanced from said station.

* * * * *